L. L. KNOX.
VALVE SYSTEM FOR REVERSING FURNACES.
APPLICATION FILED JULY 8, 1916.

1,250,900.

Patented Dec. 18, 1917.
5 SHEETS—SHEET 1.

WITNESSES

INVENTOR

L. L. KNOX.
VALVE SYSTEM FOR REVERSING FURNACES.
APPLICATION FILED JULY 8, 1916.

1,250,900.

Patented Dec. 18, 1917.
5 SHEETS—SHEET 2.

WITNESSES

INVENTOR

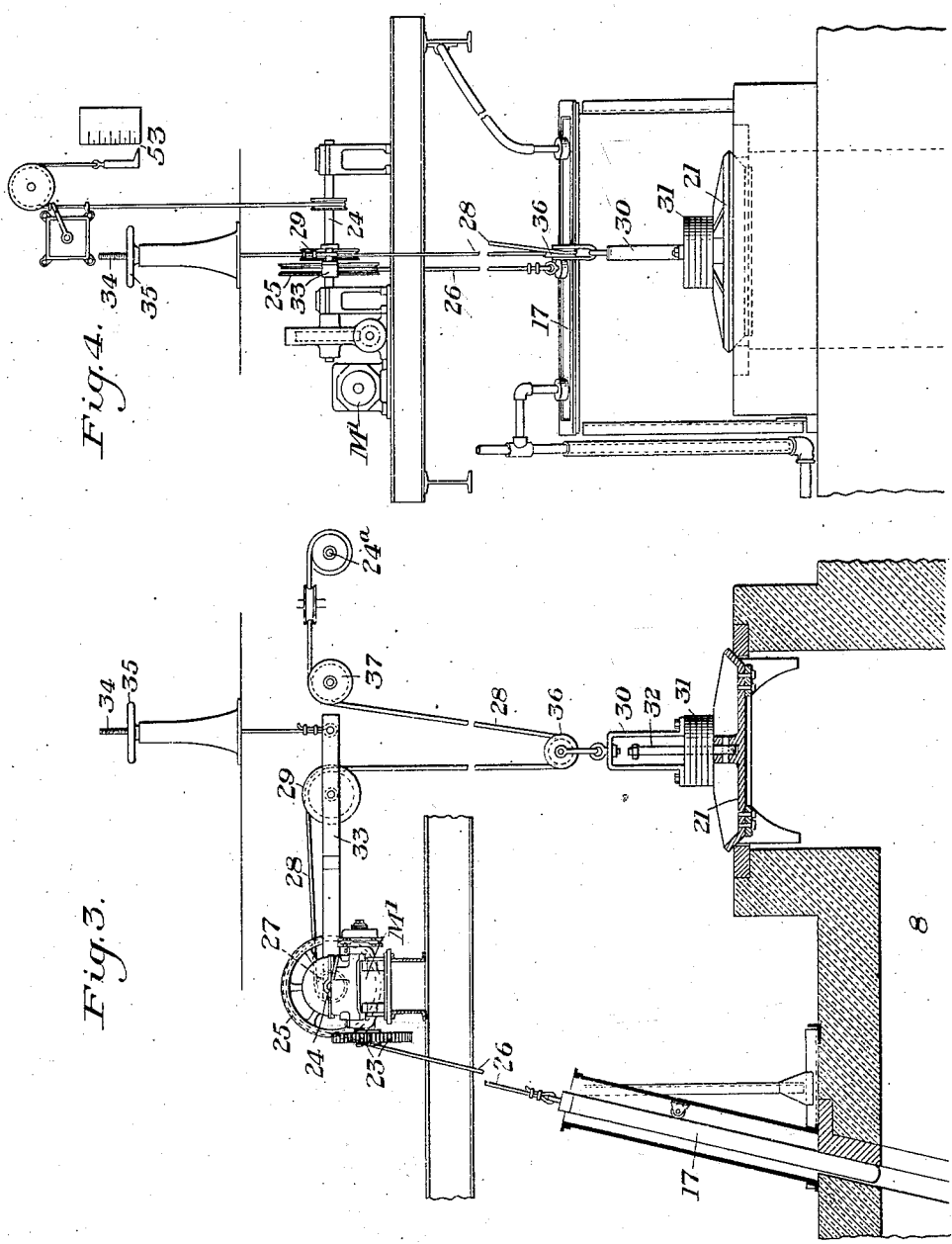

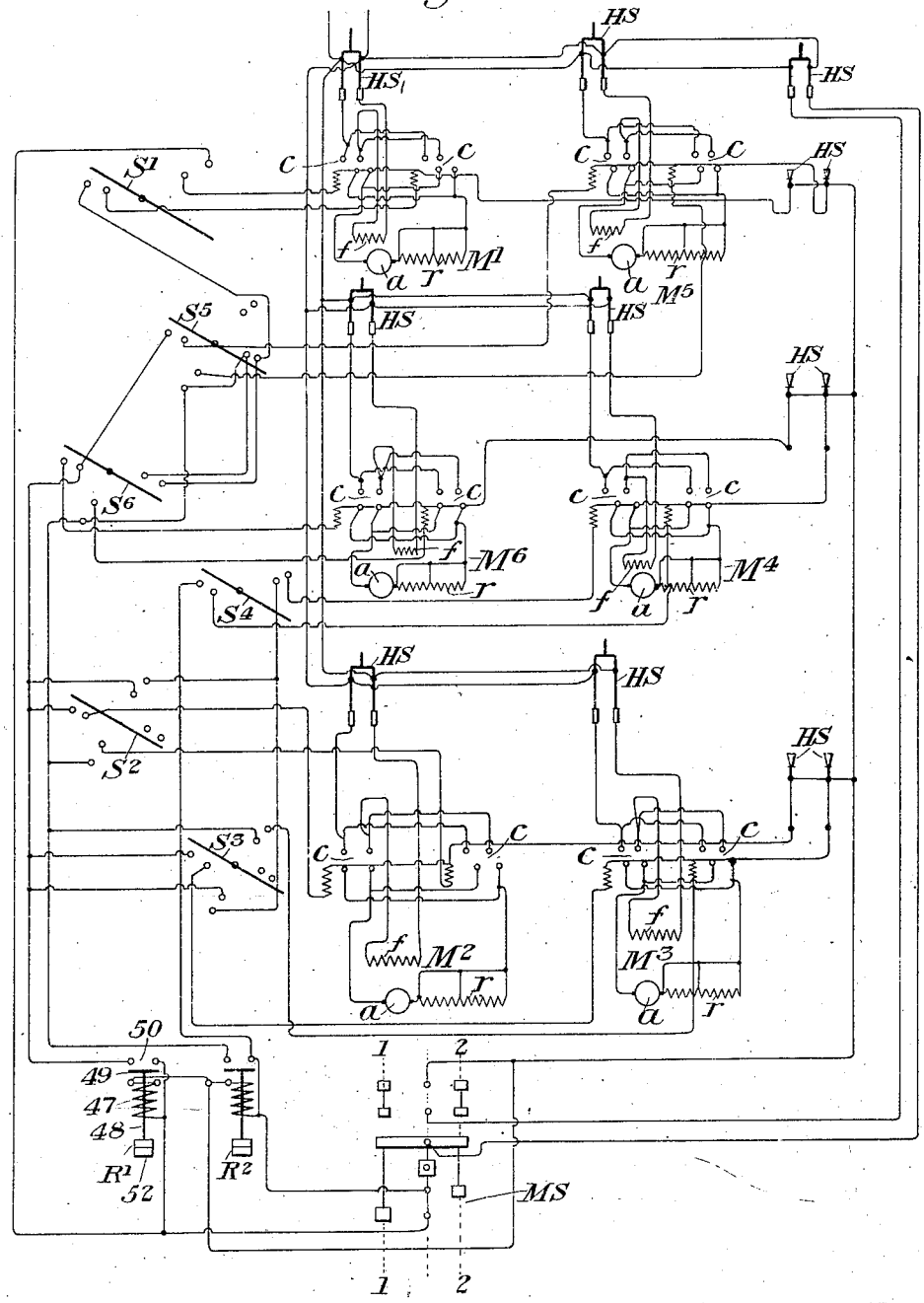
L. L. KNOX.
VALVE SYSTEM FOR REVERSING FURNACES.
APPLICATION FILED JULY 8, 1916.
1,250,900. Patented Dec. 18, 1917.

L. L. KNOX.
VALVE SYSTEM FOR REVERSING FURNACES.
APPLICATION FILED JULY 8, 1916.

1,250,900. Patented Dec. 18, 1917.
5 SHEETS—SHEET 5.

WITNESSES

INVENTOR
L. L. Knox

UNITED STATES PATENT OFFICE.

LUTHER L. KNOX, OF BELLEVUE, PENNSYLVANIA, ASSIGNOR TO BLAW-KNOX COMPANY, OF PITTSBURGH, PENNSYLVANIA, A CORPORATION OF NEW JERSEY.

VALVE SYSTEM FOR REVERSING-FURNACES.

1,250,900.  Specification of Letters Patent.  Patented Dec. 18, 1917.

Application filed July 8, 1916. Serial No. 108,130.

*To all whom it may concern:*

Be it known that I, LUTHER L. KNOX, a citizen of the United States, residing at Bellevue, in the county of Allegheny and State of Pennsylvania, have invented a new and useful Improvement in Valve Systems for Reversing-Furnaces, of which the following is a full, clear, and exact description, reference being had to the accompanying drawings, forming part of this specification, in which:

Fig. 3 is a view partly in side elevation and partly in vertical section showing one of the gas intake and regulator valves with its connected air valve;

Fig. 4 is an end view of the parts shown in Fig. 3;

Fig. 5 is a wiring diagram illustrating one arrangement of electric motors, switches and circuits for operating the valves;

Figure 1:
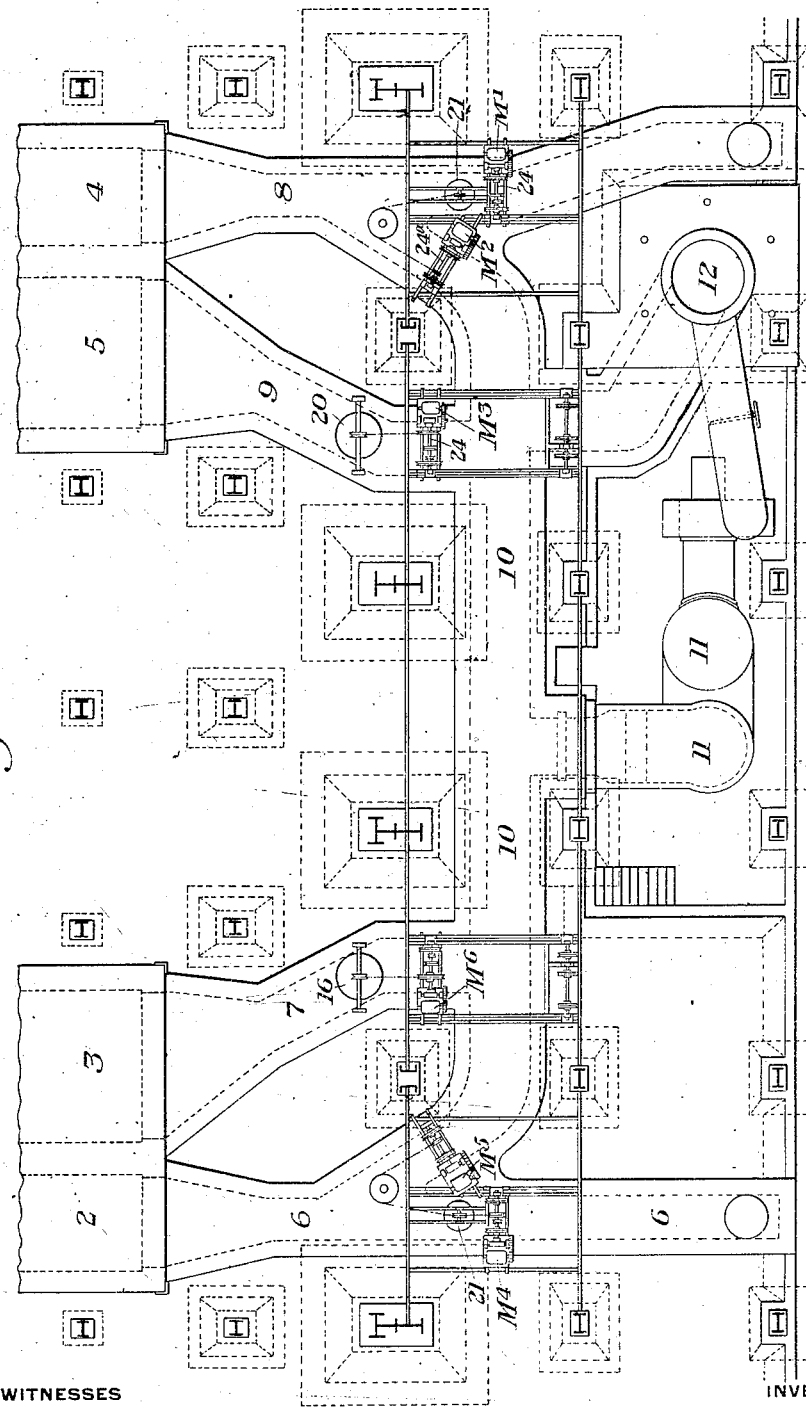
Figure 1 is a top plan view of a valve and flue system embodying my invention.

My invention has relation to a valve system for reversing furnaces, particularly applicable to open hearth furnaces of the reversing type.

In the operation of such furnaces as heretofore carried out, there is a very considerable wastage of gas at each reversal of the furnace, due to the fact that all gas between the gas inlet valve and the furnace will, upon the reversal of the furnace, be driven out into the stack without being consumed. My invention is designed to provide a valve arrangement by which this gas wastage will be prevented and all the gas admitted at the gas intakes will be thoroughly consumed. My invention also provides a valve system of this character in which the various valves are operated in a certain definite order and in predetermined time relations.

Referring to the accompanying drawing, in which I have shown one embodiment of my invention, the numeral 2 designates a portion of the gas regenerator for one end of the furnace, 3 the air regenerator at that end, 4 the gas regenerator for the opposite end of the furnace, and 5 the air regenerator for such opposite end. 6 is the gas inlet flue leading to the regenerator 2, 7 is the air inlet flue leading to the regenerator 3, 8 is the gas inlet flue leading to the regenerator 4, and 9 is the air inlet flue leading to the regenerator 5. 10 is the stack flue with which the flues 6, 7, 8 and 9 communicate. In the particular arrangement shown in Figs. 1 and 2, the outgoing gases are arranged to supply the waste heat boiler 11 before passing to the stack 12.

The numeral 13 is the gas inlet regulator valve for the flue 6. 14 is the reversing valve for said flue. 15 is the air-reversing valve for the flue 7, and 16 is the air inlet valve for said flue. 17 is the gas intake and regulator valve for the flue 8, 18 is the gas-reversing valve for said flue, 19 is the air-reversing valve for the flue 9, and 20 is the air inlet valve for the flue 9. Valves 13, 14, 15, 17, 18 and 19 are shown as of the vertically sliding damper type and may be constructed in accordance with my Patent No. 1,142,180, dated June 8, 1915. The valves 16 and 20 are of a vertical lift type, being arranged to seat downwardly upon seats at the mouths of the respective air inlet ports which they control. Each of the flues 6 and 8 is provided with an air inlet valve 21, arranged between the valve 13 or 17 and the regenerator 2 or 4. The purpose of these valves 21 will hereinafter appear.

In accordance with my invention, I provide each of the valves 13, 14, 15, 17, 18 and 19 with an actuating motor by means of which it may be opened or closed, and have shown these as electric motors. The motors for the valves 15, 17, and 19 are also made to operate, respectively, the valves 16, 21 and 20, and means is also provided, whereby the motor for operating the valve 18 will effect the closing of the valves 21.

Before proceeding to a description of these motors and their connections, the desired operation of the valves will be stated. Assuming valve 17 at the right-hand end of Fig. 2, to be opened, valves 18 and 19 to be closed, and air inlet valve 20 to be opened, and that at the left-hand side of said figure, the valve 13 and the valve 16 are closed and the valves 14 and 15 are opened, the operation of the furnace is the ordinary one, gas passing from the flue 8 into the regenerator 4 and thence to the furnace, where it meets the air coming in through the valve 20 and flue 9 and regenerator 5; and the waste gases passing out to the stack 10 through the regenerators 2 and 3, and the flues 6 and 7. When it is desired to reverse the furnace, the actuating motors are so controlled and arranged that the gas intake and regulator valve 17 will be closed before opening either the valves 18 or 19 and before any operation of any of the valves at the opposite end.

The closing of the valve 17 effects the opening of the adjacent valve 21, thereby admitting sufficient air to sweep all gas trapped behind the valve 17 through the regenerator 4 into the furnace. After a predetermined time interval, the proper motors will be set into operation to open the valves 18 and 19, and close the valves 20 and 21, and at the same time, close valves 14 and 15 and open valve 16. Thereafter, the motor of valve 13 will be operated to open said valve. The reverse cycle of operation is the same as above described, except that the motor of valve 13 is first actuated to close said valve. From the foregoing, it will readily be seen that upon each reversal of the furnace, all gas trapped between the furnace and the gas intake and regulator valve at that end will be completely burned before reversal takes place.

Obviously, the necessary control and time relation in the operation of the several motors may be widely varied as may also be actuating connections between the motors and the several valves. The arrangement shown in the drawings and which will now be described is therefore illustrative only.

M' is the motor for operating the valve 17; M² the motor for operating the valve 18; M³ the motor for operating the valve 19; M⁴ the motor for operating the valve 13; M⁵ the motor for operating the valve 14; M⁶ the motor for operating the valve 15. Each of these motors is suitably geared, as indicated in Fig. 1, to a rotary shaft carrying a winding member or drum having a cable which is connected to the damper valve to be directly operated. Substantially the same arrangement may be provided for each of these damper valves as that indicated in Figs. 3 and 4 for actuating the valve 17. In these figures, the shaft of the motor M' is suitably geared, as indicated at 23, to a winding shaft 24, having a winding wheel or drum 25 from which a flexible cable 26 leads to the valve 17. Each of the motors M', M³, M⁴, and M⁶ is also required to operate one of the air inlet valves. The arrangement for each of these motors for this purpose may also be the same as shown in Figs. 3 and 4, with respect to the air inlet valve 21. For this purpose, the shaft 24 is provided with another winding member 27, from which a cable 28 extends in a reverse direction over a suitable pulley 29, and is connected at its lower end to a yoke 30 attached to a weight 31, which has a sliding engagement with the stem 32 of the valve 21. The pulley 29 is shown as carried upon a lever 33, fulcrumed on the shaft 24 and having connected thereto an actuating screw 34, which can be adjusted by means of the hand wheel 35, to thereby regulate the action of the valve 21. It will be apparent from these Figs. 3 and 4 that when the motor M' is actuated to close the valve 17 and during the closing movement of said valve, the weight 31 will slide upwardly on the stem 32, and that at about the time the valve 17 is closed, the said weight will come into lifting engagement with the stem 32 and will thereby lift the valve 21 from its seat. Likewise, that when the motor M' is operated in the reverse direction to open the valve 17, the valve 21 will be closed.

The operation of the air inlet valves 16 and 20 by the respective motors M⁶ and M³ may also be effected in the same manner, each of said air inlet valves closing when its corresponding air-reversing valve is opened and being opened when its corresponding air-reversing valve is closed. As it is desirable to close each air inlet valve 21, when the adjacent gas-reversing valve is opened, I provide a connection for this purpose between the actuating connections for such gas-reversing valve and the said air inlet valve. A suitable connection for this purpose is indicated in Fig. 3, in which the rope or cable 28 is carried under a pulley 36, attached to the yoke 30 and thence over a suitable guiding pulley or pulleys 31 and to corresponding shaft 24ᵃ of the operating connections of the adjacent gas-reversing valve. It will readily be apparent from this figure that when such gas-reversing valve is opened, it will operate to close the valve 21.

Figure 6:
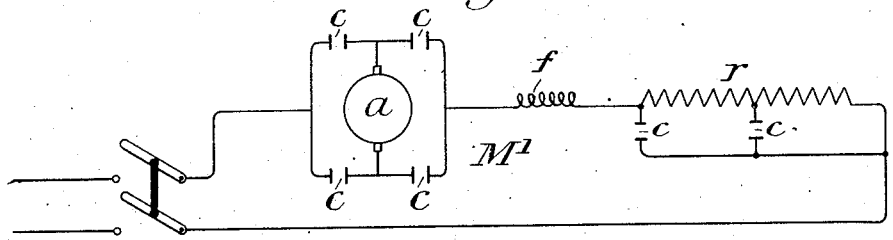
Fig. 6 is a simplified wiring diagram of one of the motor circuits.
Figure 9:
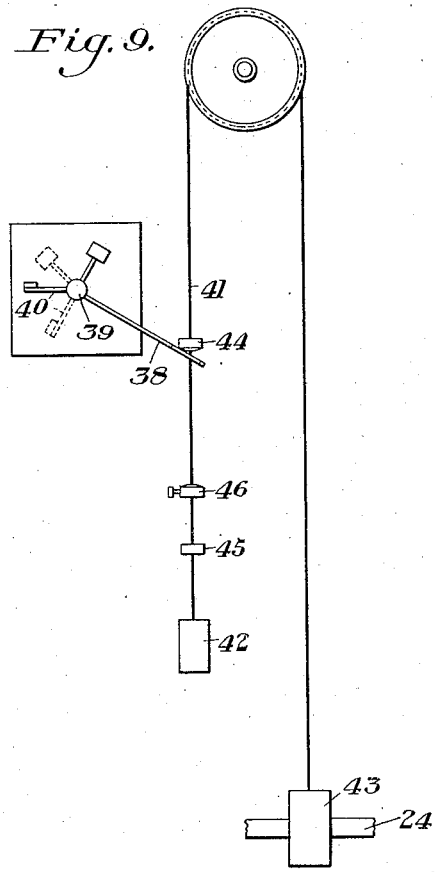
Fig. 9 is a diagram showing one of the automatic reversing controllers.

In Fig. 5, I have shown a wiring diagram of the various motor circuits and of the controlling apparatus therefor, whereby said motors are operated in the proper time relations. In this diagram, $a$ wherever seen designates a motor armature; $f$ a motor field; $r$ starting resistance for the motors; and HS manual switches which may be provided for further control. MS is the master switch having a neutral position and two operative positions, one of which operates to effect the energization of motor M', and the other of which operates to effect the energization of motor M⁴. Each motor has its field and armature circuit provided with a plurality of solenoid operative contactor switches $c$, of any well known character, whereby it may be reversed; and the resistance $r$ of each motor may also be provided with similar contactor switches for throwing the resistance into and out of circuit. This will be clearly understood by reference to Fig. 6, which shows a simplified wiring diagram of the local circuit of one motor. Each motor has its circuit provided with a time limit switch; S' being the switch for motor M'; S² being the switch for motor M²; S³ being the switch for motor M³; S⁴ being the switch for motor M⁴; S⁵ being the switch for motor M⁵; and S⁶ being the switch for motor M⁶. The switches S' and S⁴ are of the single-pole double-throw type, while the other four switches are of the double-pole double-throw type. The construction and mode of operation of each of these switches will be best understood by reference to Figs. 5 and 9. Each switch has an arm 38, attached to a suitable member 39 at the center of the switch, and to which is connected a movable switch arm 40, adapted to operate with the fixed contacts of the switch. The outer end portion of the arm 38 has a slot therein, through which passes a cord or cable 41, whose free end is counterweighted, as shown at 42, and whose opposite end is connected to a winding member 43 of one of the shafts 24. Each cable 41 is provided with three stops 44, 45 and 46. The stop 44 acts to stop the valve when it reaches its extreme closed position. The stop 45 acts to stop the valve when it reaches its extreme open position. The stop 46 is an intermediate stop which can be adjusted for the purpose of stopping the valve at any partial opening desired, depending upon its position on the cable 41. These stops engage with and actuate the lever arm 38 of the time limit switch. The switch shown in Fig. 9 is one of the single-pole type switches, but the double-pole switches are of similar construction except that they are provided with four points of electric contact instead of two. Each of the single-pole switches acts to make a quick make or break of the circuit, while the double-pole switches not only stop the motor at fixed points, but also establish certain return circuits by which the valve controlled thereby can be brought back to its original position.

Figure 7:
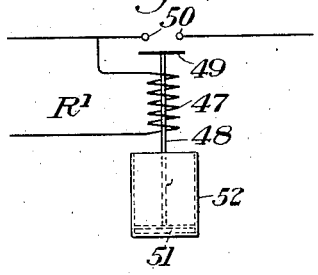
Fig. 7 is a detail diagrammatic view of one of the time limit relays.
Figure 8:
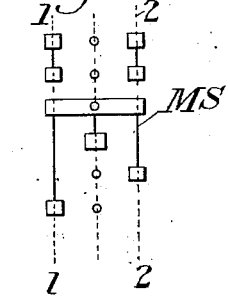
Fig. 8 is a diagram of the master controller.

The leads from the master controller are provided with time limit relays R', R², one of which is shown in detail diagrammatically in Fig. 7. Each of these relays consists of a solenoid 47, wound with a voltage coil and plunger 48 carrying a contact member 49, adapted to open and close the circuit between the terminals 50. Each plunger 48 is also connected to a piston 51, which operates in a dash-pot vessel 52. This dash-pot is preferably of a character which can be adjusted over a wide range to permit of a slow lifting of the plunger, thus introducing the time element between the energization of the solenoid coil and the actual closing of the contacts 49 and 50.

Figure 2:
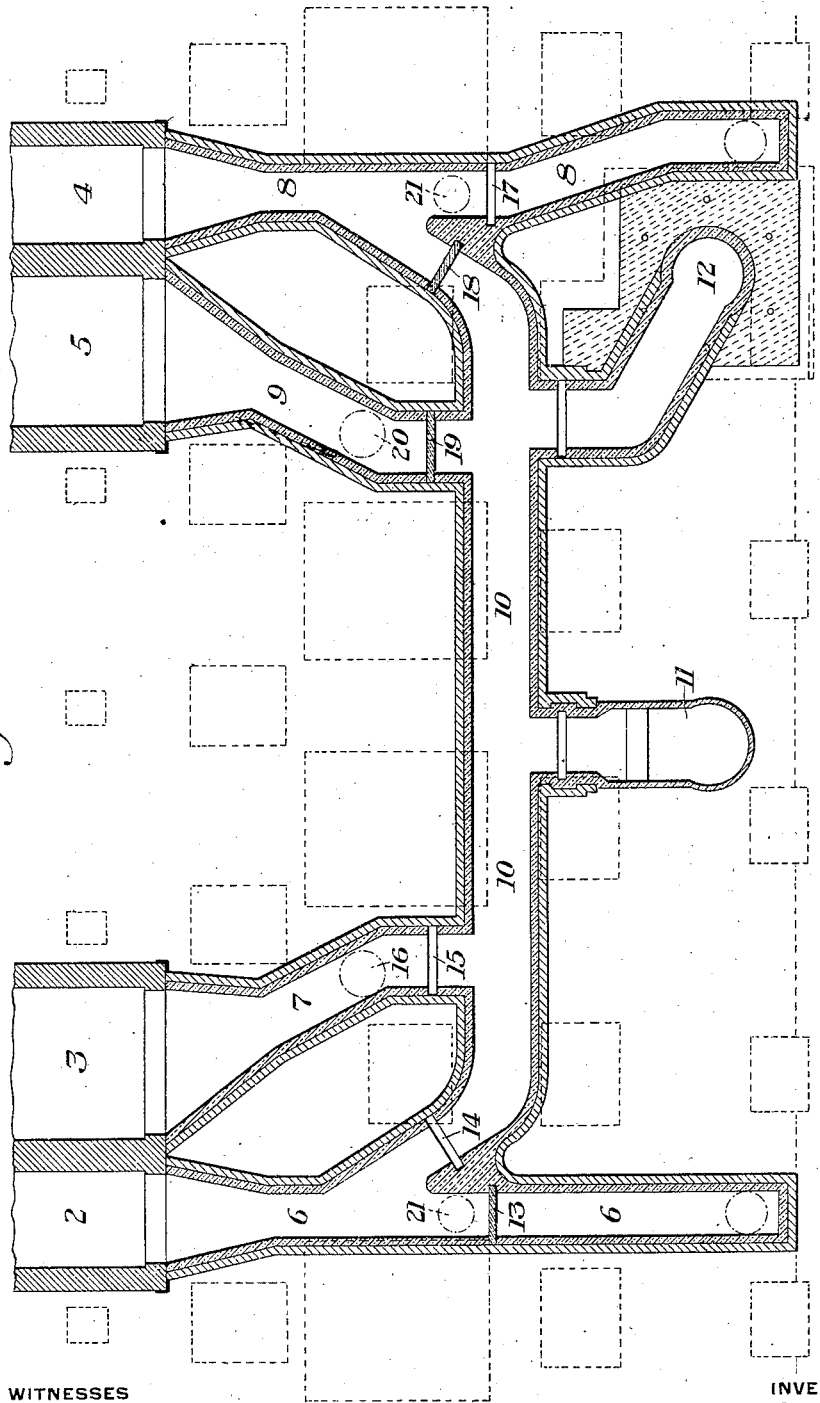
Fig. 2 is a sectional plan view of the same.

It will be unnecessary to describe in detail the various circuit connections of the several motors, since these can be readily traced on the wiring diagram of Fig. 5. The complete cycle of the operation is as follows:

Assuming the valves to be in the position indicated in Fig. 2, and that it is desired to reverse the furnace, the master controller is thrown to its left-hand position, thereby closing the circuit of the motor M'. This operation energizes said motor M' in the direction for closing the valve 17, by proper actuation of the contact switches c of that motor. At the same time, it energizes the voltage coil on the time limit relay R'. valve 17 now commences to close, and as it closes, it opens its adjacent air inlet valve 21. When the valve 17 reaches the limit of its travel or becomes fully closed, its limit switch S' is actuated to open the control circuit of said motor, thus bringing it to a stop. In order to effect the proper stopping of the motors, they are preferably all equipped with solenoid brakes of any well known type. This operation of the limit switch S' establishes a reverse circuit of said motor M', which, however, is not fully completed until the valves are reversed in the manner hereinafter described.

After a predetermined time, for example, thirty seconds after the time limit relay R' has become energized, its plunger is operated to establish a circuit across its terminals 50. This operation completes the circuit to the controllers of motors M², M³, M⁵, M⁶, in such a direction that the valves 14 and 15 will immediately begin to close and will continue to close until they have reached their maximum distance of travel when they will be automatically stopped by the action of their respective limit switches. The control of the motors M² and M³ by the valves 18 and 19 is likewise established in such a direction as to cause these valves to begin to open, the distance or extent of such opening being accurately determined by the positioning of the adjustable stops 46. When the four valves 14, 15, 18 and 19 have completed their travel to the motors, and have come to rest, the combined actions of the four limit switches S², S³, S⁵ and S⁶ will have been such as to establish a control circuit for the motor M⁴ of the valve 13, and will cause said motor to open the valve 13 to its maximum position and until it is stopped by the action of its limit switch. When this limit switch S⁴ is actuated, it opens the circuit to the motor M⁴ and simultaneously establishes a reverse circuit of said motor, although such circuit is not completed until the master controller is thrown to the reverse position after performing the reverse cycle of operation.

The reverse cycle is the same as above described, except that the master switch is thrown to the right-hand position and the motor M⁴ is first energized. The valve 13 then immediately closes and automatically stops at the end of its travel. Time limit relay R² is also energized by this movement of the master controller, establishing a circuit across its contacts in the same manner as described in connection with the relay R'. The action of the relay R² closes the control circuit to the motors M², M³, M⁵ and M⁶ of the respective valves 18, 19, 14 and 15 in such a direction that the valves 14 and 15 are opened and the valves 18 and 19 are closed. When these four valves have again completed this cycle of operation, their respective limit switches complete the circuit of the motor M' of the valve 17 in such a direction as to cause this valve to open. The parts are now in their original position and are ready for another complete cycle of operation, which is a duplicate of that before described.

The advantages of my invention will be readily apparent to those familiar with the operation of reversing furnaces. It not only provides a system of actuating motors by various valves capable of being controlled by a single operator at some central point where the master switch is located, but, owing to the described inter-relation of the motors, the valves are operated in the desired time relation so as to effect the complete combustion of the gas, as already described. The several operations are all effected by simple movement of the master switch, the motors and valves being automatically stopped at the proper time. The valve-actuated mechanism may be provided with a suitable indicator, such as shown at 53, in Fig. 4, so that the operator can by a glance ascertain the position of every valve. As hereinbefore stated, the arrangement of the actuating motors and their connections with the several valves, as well as the inter-relation of their circuits, is subject to various changes in detail.

I claim:

1. In a valve system for reversing furnaces, the combination of air and gas supply flues provided respectively with air and gas inlet control valves, each of the gas flues also having an air inlet and a valve controlling such inlet, and actuating means and connections whereby the valve controlling each said air inlet will be opened when the gas control valve in the corresponding gas supply flue is closed, substantially as described.

2. In a valve system for reversing furnaces, the combination of air and gas supply flues, each of said flues having a control valve, and each of the gas flues also having an air inlet and a valve controlling such inlet, of motive means and connections whereby the opening of the gas reversing valve of each gas flue will effect a closing of the corresponding air inlet control valve in the corresponding gas supply flue, substantially as described.

3. A valve system for reversing furnaces having each of its gas flues provided with a gas inlet valve and with an air inlet valve located between said gas inlet valve and the furnace, and means for automatically opening said air inlet valve upon the closing of the gas inlet valve, substantially as described.

4. A valve system for reversing furnaces, having each of its gas flues provided with a gas inlet valve and with an air inlet valve located between said gas inlet valve and the furnace, actuating means for the gas inlet valve, connections between the air inlet valve and the gas inlet valve, and operating means together with said connections whereby when the gas inlet valve is closed the air inlet valve will be automatically opened, and other means for closing the air inlet valve after a predetermined time interval, substantially as described.

5. In a valve system for reversing furnaces, the combination of air and gas supply flues provided respectively with air and gas control valves, each of the gas flues also having an air inlet between the gas inlet valve and the furnace, valves controlling such air inlets, and interconnected operating mechanism for the said several valves whereby they are mechanically operated in predetermined time relation to each other, substantially as described.

6. In a valve and flue system for reversing furnaces, the combination of gas and air supply flues for each end of the furnace, a separate gas valve for controlling each gas supply flue, a separate gas-reversing valve for each gas flue, an air inlet valve for each air supply flue, an air-reversing valve for each air supply flue, each gas supply flue also having an air supply valve located between its controlling valve and the furnace, and motive means for operating said valves in predetermined time relation, substantially as described.

7. In a valve and flue system for reversing furnaces, the combination of gas and air supply flues for each end of the furnace, a separate gas valve for controlling each gas supply flue, a separate gas-reversing valve for each gas flue, an air inlet valve for each air supply flue, an air-reversing valve for each air supply flue, each gas supply flue also having an air supply valve located between its controlling valve and the furnace, and motive means and actuating connections whereby at each reversal of the furnace one of the gas-controlling valves is closed and the air inlet valve of that gas flue is then opened, after which the adjacent gas-reversing and air-reversing valves are opened, substantially as described.

8. In a valve and flue system for reversing furnaces, the combination of gas and air supply flues for each end of the furnace, a separate gas valve for controlling each gas supply flue, a separate gas-reversing valve for each gas flue, an air inlet valve for each air supply flue, an air-reversing valve for each air supply flue, each gas supply flue also having an air supply valve located between its controlling valve and the furnace, and electric motors for operating said valves, said motors having inter-related circuits and controlling means for said circuits, whereby the several motors are energized in predetermined time relations, substantially as described.

9. In a valve and flue system for reversing furnaces, the combination of gas and air supply flues for each end of the furnace, a separate gas valve for controlling each gas supply flue, a separate gas-reversing valve for each gas flue, an air inlet valve for each air supply flue, an air-reversing valve for each air supply flue, each gas supply flue also having an air supply valve located between its controlling valve and the furnace, motors for actuating the several valves, said motors having inter-related circuits, and controlling means therefor, said means including time limit switches whereby the motors are energized in predetermined time relations, substantially as described.

10. In a valve and flue system for reversing furnaces, the combination of gas and air supply flues for each end of the furnace, a separate gas valve for controlling each gas supply flue, a separate gas-reversing valve for each gas flue, an air inlet valve for each air supply flue, an air-reversing valve for each air supply flue, each gas supply flue also having an air supply valve located between its controlling valve and the furnace, and electric motors for operating said several valves, said motors having inter-related circuits and also having controlling switches controlled in part by the movements of certain of said valves, substantially as described.

11. A valve system for reversing furnaces, comprising a plurality of gas and air-controlling valves, a plurality of electric motors for actuating said valves, said motors having inter-related circuits, a master switch for controlling said circuits, and automatic switches controlled by the movements of the master switch and of the valves for effecting the operations of said motors in certain predetermined time relations, substantially as described.

12. A valve system for reversing furnaces, comprising a plurality of gas and air-controlling valves, a plurality of electric motors for actuating said valves, said motors having inter-related circuits, a master switch for controlling said circuits, and automatic switches controlled by the movements of the master switch and of the valves for effecting the operations of said motors in certain predetermined time relations, together with means for indicating the positions of the several valves, substantially as described.

13. In a valve system for reversing furnaces, a gas inlet flue having a gas inlet control valve and an air inlet valve located between the said control valve and the furnace, and actuating mechanism for said valves whereby they may be operated in reverse directions in predetermined time relation to each other, substantially as described.

14. In a valve system for reversing furnaces, the combination with gas and air flues leading to opposite ends of the furnace and a plurality of gas and air control and reversing valves for said flues, of a plurality of electric motors for operating the said valves, said motors having interconnected circuits, a master switch for the control of said circuits, and other switches actuated by the movements of the valves, whereby the several valves are operated by said motors in predetermined time relation to each other, substantially as described.

In testimony whereof, I have hereunto set my hand.

LUTHER L. KNOX.

Witnesses:
Geo. B. Bleming,
H. M. Corwin.